United States Patent
Laursen et al.

(10) Patent No.: US 8,038,015 B2
(45) Date of Patent: Oct. 18, 2011

(54) EQUIPMENT RACK PANEL SYSTEM AND METHOD

(75) Inventors: Erik Laursen, Kirkland, WA (US); Jennifer M. Waite, Renton, WA (US); Mark E. Dearing, Bothell, WA (US); Keith B. Kosanovich, Mill Creek, WA (US); Mark A. Guymon, Everett, WA (US)

(73) Assignee: Leviton Manufacturing Co., Ltd., Melville, NY (US)

( * ) Notice: Subject to any disclaimer, the term of this patent is extended or adjusted under 35 U.S.C. 154(b) by 0 days.

(21) Appl. No.: 12/861,701

(22) Filed: Aug. 23, 2010

(65) Prior Publication Data

US 2010/0314339 A1 Dec. 16, 2010

Related U.S. Application Data

(62) Division of application No. 11/852,822, filed on Sep. 10, 2007.

(60) Provisional application No. 60/825,100, filed on Sep. 8, 2006.

(51) Int. Cl.
*A47F 7/00* (2006.01)

(52) U.S. Cl. ........................................................ 211/26

(58) Field of Classification Search .................... 211/26, 211/26.2, 13.1, 175, 183; 174/101, 68.3; 439/49, 532, 553, 510
See application file for complete search history.

(56) References Cited

U.S. PATENT DOCUMENTS

| D91,692 | S | | 3/1934 | Stuart |
| 2,027,619 | A | | 1/1936 | Rutherford |
| D240,725 | S | | 7/1976 | Dillon |
| 4,477,934 | A | | 10/1984 | Salminen |
| 4,622,911 | A | | 11/1986 | Salminen |
| D288,802 | S | | 3/1987 | Bramwell |
| D292,088 | S | | 9/1987 | Eriksson |
| 4,712,232 | A | * | 12/1987 | Rodgers ........................ 379/329 |
| 4,720,876 | A | | 1/1988 | Tomei et al. |
| 4,767,338 | A | * | 8/1988 | Dennis et al. ................. 439/455 |
| 4,909,757 | A | * | 3/1990 | Reed .............................. 439/532 |
| 5,035,645 | A | * | 7/1991 | Siemon et al. ................ 439/532 |
| 5,125,852 | A | * | 6/1992 | Archer .......................... 439/555 |
| D343,312 | S | | 1/1994 | Burdick et al. |
| D366,102 | S | | 1/1996 | Bonnell |
| D367,849 | S | | 3/1996 | Pedinielli et al. |
| 5,548,489 | A | * | 8/1996 | Reed et al. .................... 361/827 |
| 5,575,665 | A | * | 11/1996 | Shramawick et al. .......... 439/49 |
| 5,647,763 | A | * | 7/1997 | Arnold et al. .............. 439/540.1 |
| D383,854 | S | | 9/1997 | Ruscitto |
| D408,358 | S | * | 4/1999 | Wersching et al. .......... D13/147 |

(Continued)

OTHER PUBLICATIONS

U.S. Appl. No. 29/376,368, Oct. 6, 2010, Laursen et al.

(Continued)

*Primary Examiner* — Sarah Purol
(74) *Attorney, Agent, or Firm* — Davis Wright Tremaine LLP; George C. Rondeau, Jr.; Heather M. Colburn (57) ABSTRACT

An equipment rack panel system using one or more rack extension panels with optional raceway to interconnect equipment cables to service cables through connectors within the rack extension panel. The rack extension panel is either fastened to or integral with one of the posts of the equipment rack or otherwise adjacent to the equipment rack and extends away from the equipment rack so as not to occupy space within the equipment rack normally reserved for equipment.

22 Claims, 12 Drawing Sheets

U.S. PATENT DOCUMENTS

| | | | |
|---|---|---|---|
| 5,911,519 A | 6/1999 | Eutebach | |
| 5,970,535 A | 10/1999 | Wayne | |
| 6,077,113 A * | 6/2000 | Lecomte | 439/540.1 |
| D431,659 S | 10/2000 | Bouchard | |
| 6,307,750 B1 | 10/2001 | Bendikas et al. | |
| 6,347,715 B1 * | 2/2002 | Drozdenko et al. | 211/26 |
| D460,568 S | 7/2002 | Messier | |
| 6,489,565 B1 * | 12/2002 | Krietzman et al. | 174/101 |
| 6,497,586 B1 * | 12/2002 | Wilson | 439/532 |
| 6,605,782 B1 * | 8/2003 | Krietzman et al. | 174/101 |
| 6,708,830 B2 * | 3/2004 | Mendoza | 211/26 |
| 6,826,057 B1 | 11/2004 | Gundogan et al. | |
| 6,866,541 B2 * | 3/2005 | Barker et al. | 439/540.1 |
| 6,958,916 B2 | 10/2005 | Roesner et al. | |
| D515,222 S | 2/2006 | Kieffer | |
| 7,087,840 B2 * | 8/2006 | Herring et al. | 174/101 |
| 7,119,282 B2 * | 10/2006 | Krietzman et al. | 174/101 |
| 7,172,077 B2 * | 2/2007 | Mendoza | 211/26 |
| 7,241,170 B1 * | 7/2007 | Lindner et al. | 439/539 |
| 7,371,109 B2 * | 5/2008 | Verding | 439/532 |
| 7,414,835 B2 | 8/2008 | Karakura et al. | |
| 7,529,458 B2 * | 5/2009 | Spisany et al. | 385/137 |
| 7,619,328 B2 | 11/2009 | Peng | |
| 7,637,773 B2 * | 12/2009 | Shifris et al. | 439/540.1 |
| 7,682,187 B2 * | 3/2010 | Spitaels et al. | 439/532 |
| 7,690,921 B2 * | 4/2010 | Timmins et al. | 439/49 |
| 7,811,093 B2 * | 10/2010 | Timmins et al. | 439/49 |
| 7,811,122 B2 * | 10/2010 | Clark et al. | 439/534 |
| 7,821,790 B2 | 10/2010 | Sharma et al. | |
| 2003/0062326 A1 * | 4/2003 | Guebre-Tsadik | 211/26 |
| 2007/0108139 A1 * | 5/2007 | Mendoza | 211/26 |
| 2008/0062655 A1 | 3/2008 | Laursen et al. | |
| 2008/0278904 A1 | 11/2008 | Carr et al. | |
| 2009/0038070 A1 | 2/2009 | Belanger et al. | |
| 2009/0056077 A1 | 3/2009 | Belanger et al. | |
| 2009/0142965 A1 | 6/2009 | Spitaels et al. | |
| 2009/0283488 A1 * | 11/2009 | McMillan et al. | 211/183 |
| 2009/0321371 A1 * | 12/2009 | Rathbone et al. | 211/26.2 |
| 2010/0314339 A1 * | 12/2010 | Laursen et al. | 211/26 |

OTHER PUBLICATIONS

U.S. Appl. No. 29/284,404, Sep. 7, 2007, Laursen et al.

Open Source Storage, Inc.: Patent Pending Vertical Patch Panel and Vertical Panel Switch for Datacenter Racks; ThomasNet Industrial Newsroom article; Feb. 10, 2006, 2 pages, Santa Clara; USA.

SMP Data Communications; PP1288/110A5E Patch Panels—Cat 5e, 12 Port, 568A/B Wired, Wall Mount; Product and Spec Sheet; May 5, 2004; Swannanoa, NC; USA.

* cited by examiner

EQUIPMENT RACK PANEL SYSTEM AND METHOD

CROSS REFERENCE TO RELATED APPLICATION

This application is a divisional of U.S. patent application Ser. No. 11/852,822 filed Sep. 10, 2007, which claims priority benefit of provisional application Ser. No. 60/825,100 filed Sep. 8, 2006, the content of which is incorporated in its entirety.

BACKGROUND OF THE INVENTION

1. Field of the Invention

The present invention is directed generally to equipment racks for data equipment.

2. Description of the Related Art

A conventional equipment rack, frame, cabinet and the like (referred to generally herein as a "rack") can hold conventional data equipment, sized typically in a rack unit format, such as communication, computer or other equipment, to generally provide structural support to position the data equipment in a vertically stacked arrangement within the equipment rack. Conventional patch panels, also typically sized in a rack unit format, can also be positioned in or attached to the equipment rack to receive equipment cables coupled to the data equipment for interconnecting the equipment cables with service cables via connectors carried by the patch panels.

Unfortunately, as these conventional patch panels share the vertically stacked arrangement with the data equipment within the conventional equipment rack, the equipment cables, wires, and the like (referred to generally herein as "cables") may be of undesirable length to span the distances between the data equipment and the patch panels. Furthermore, since the patch panels and data equipment may be arranged in inconvenient elevations in the equipment rack, management of the equipment cables may pose a challenge.

DETAILED DESCRIPTION OF THE INVENTION

As will be discussed in greater detail herein, an equipment rack panel system uses one or more rack extension panels to interconnect equipment cables to service cables through connectors within the rack extension panel. The equipment cables are coupled to equipment located within the rack. The rack extension panel is either fastened to or integral with one of the posts of the equipment rack or otherwise adjacent to the equipment rack and extends away from the equipment rack so as not to occupy space within the equipment rack normally reserved for equipment of rack unit format.

Figure 1:
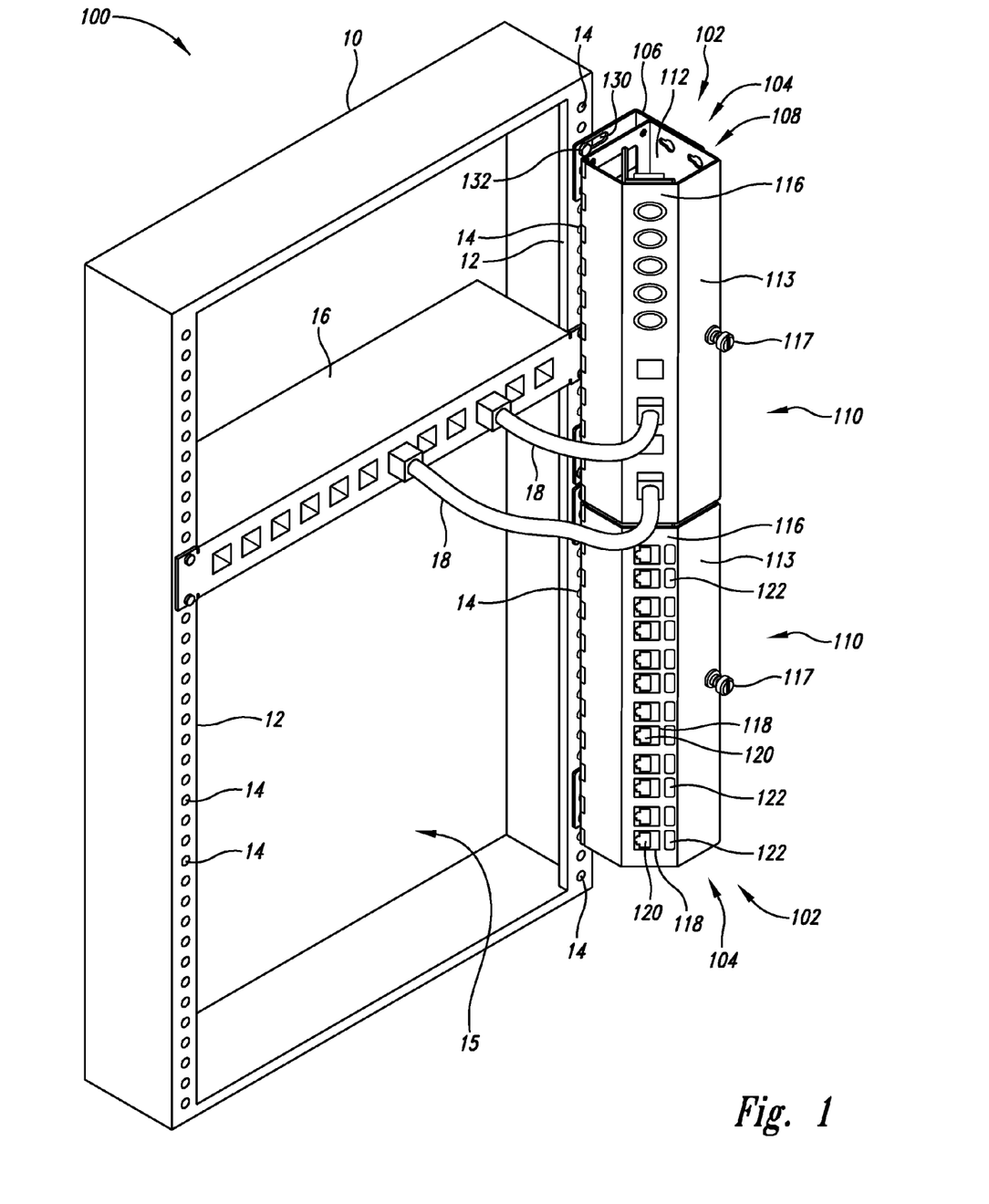
FIG. 1 is a perspective view of an equipment rack panel system including rack extension panels affixed to an equipment rack.

An equipment rack 10 having posts 12 and post holes 14 is shown in FIG. 1 as having an interior area 15 to receive data equipment 16 for support thereof by the equipment rack with equipment cables 18 coupled to the data equipment. A first implementation of an equipment rack panel system 100 is shown to have a first implementation of an extension panel 102 coupled to one of the posts 12 and receiving the equipment cables 18.

Figure 2:
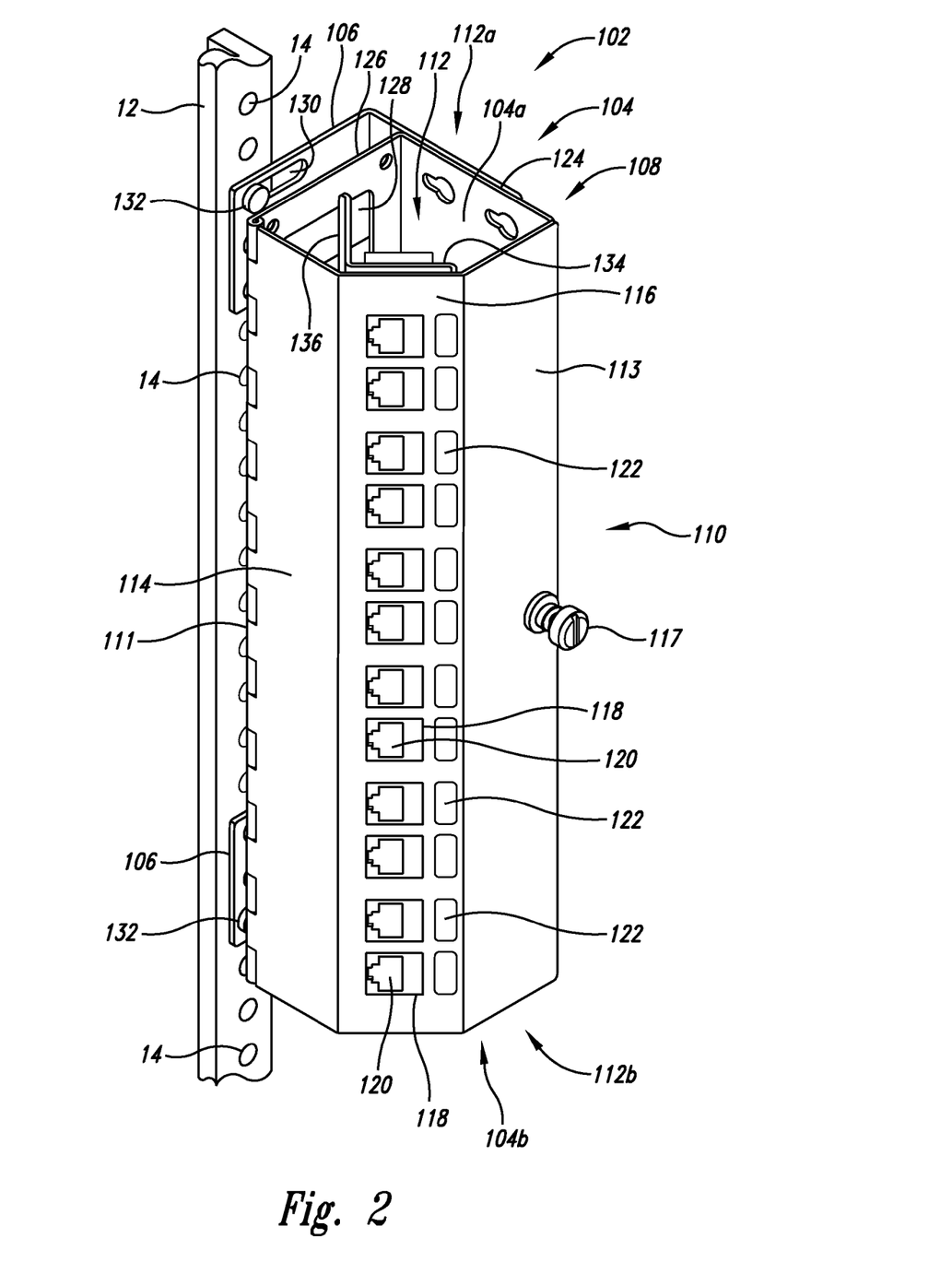
FIG. 2 is a fragmented, enlarged perspective view of the equipment rack panel system of FIG. 1.
Figure 4:
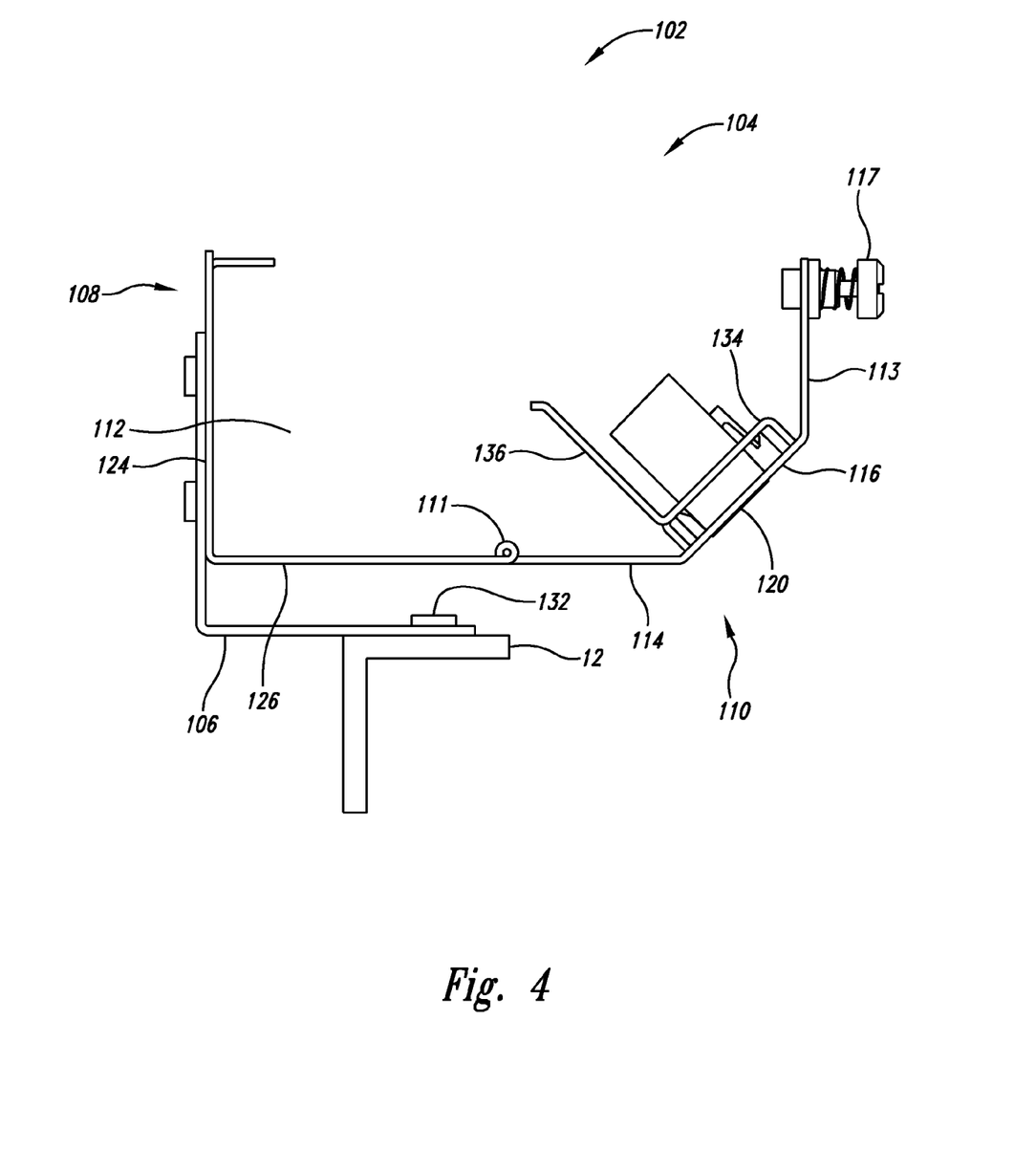
FIG. 4 is a top plan view of the rack extension panel of FIG. 3 with the door section in an open position.

As shown in FIG. 2, the rack extension panel 102 includes a connector housing 104 coupled to one of the posts 12 through brackets 106. The connector housing 104 includes a stationary section 108 and a door section 110 being coupled thereto with a piano-type hinge 111, which allows the door section to be outwardly swung about the hinge away from the stationary section (as shown in FIG. 4) to access an elongated interior area 112 of the connector housing. The elongated interior area 112 is defined in part by the stationary section 108 and the door section 110 as they extend longitudinally from an upper first end 112a of the elongated interior area to a lower second end 112b of the elongated interior area. The first end 112a and the second end 112b of the elongated interior area 112 are accessible through an upper first end opening 104a and a lower second end opening 104b of the connector housing 104. The first opening 104a and the second opening 104b of the connector housing 104 allows multiple copies of the connector housing 104 to be placed, end-to-end, one on top of the other, if an increased height of the rack extension panel 102 is desired.

Further shown in FIG. 2, the door section 110 includes a front portion 113, a side portion 114, orthogonally oriented with respect to the front portion, and an angled portion 116 angularly extending therebetween. Of note, the side portion 114 is that portion of the door section 110 of the depicted first implementation that is coupled to the stationary section 108 through the hinge 111.

The door section 110 includes a release handle 117 to unfasten the door section from the stationary section 108 to allow for rotational movement of the door section about axis of rotation of the hinge 111. The door section 110 further includes connector mounting apertures or holes 118 to receive connectors 120. Connector labels 122 are each proximally positioned with a different respective one of the connector mounting holes 118 to convey identification or other information related to the associated one of the connectors 120 positioned within the connector mounting hole.

The stationary section 108 includes a side portion 124 and a rear portion 126 orthogonally oriented with the side portion. The side portion 124 extends to abut with the front portion 113 of the door section 110 when the door section is in the closed position as shown in FIGS. 1 and 2. The rear portion 126 orthogonally extends from the side portion 124. The hinge 111 is coupled to both the rear portion 126 of the stationary section 108 and the side portion 114 of the door section 110. The rear portion 126 of the stationary section 108 has an opening 128 that allows access for service cables (not shown) into the interior area 112 of the connector housing 104 as further described below. The bracket 106 includes mounting holes 130 to receive bolts 132 for coupling the rack extension panel 102 to one of the rack posts 12 of the equipment rack 10. In other implementations, the rack extension panel 102 can be otherwise affixed adjacent to the equipment rack 10.

Figure 3:
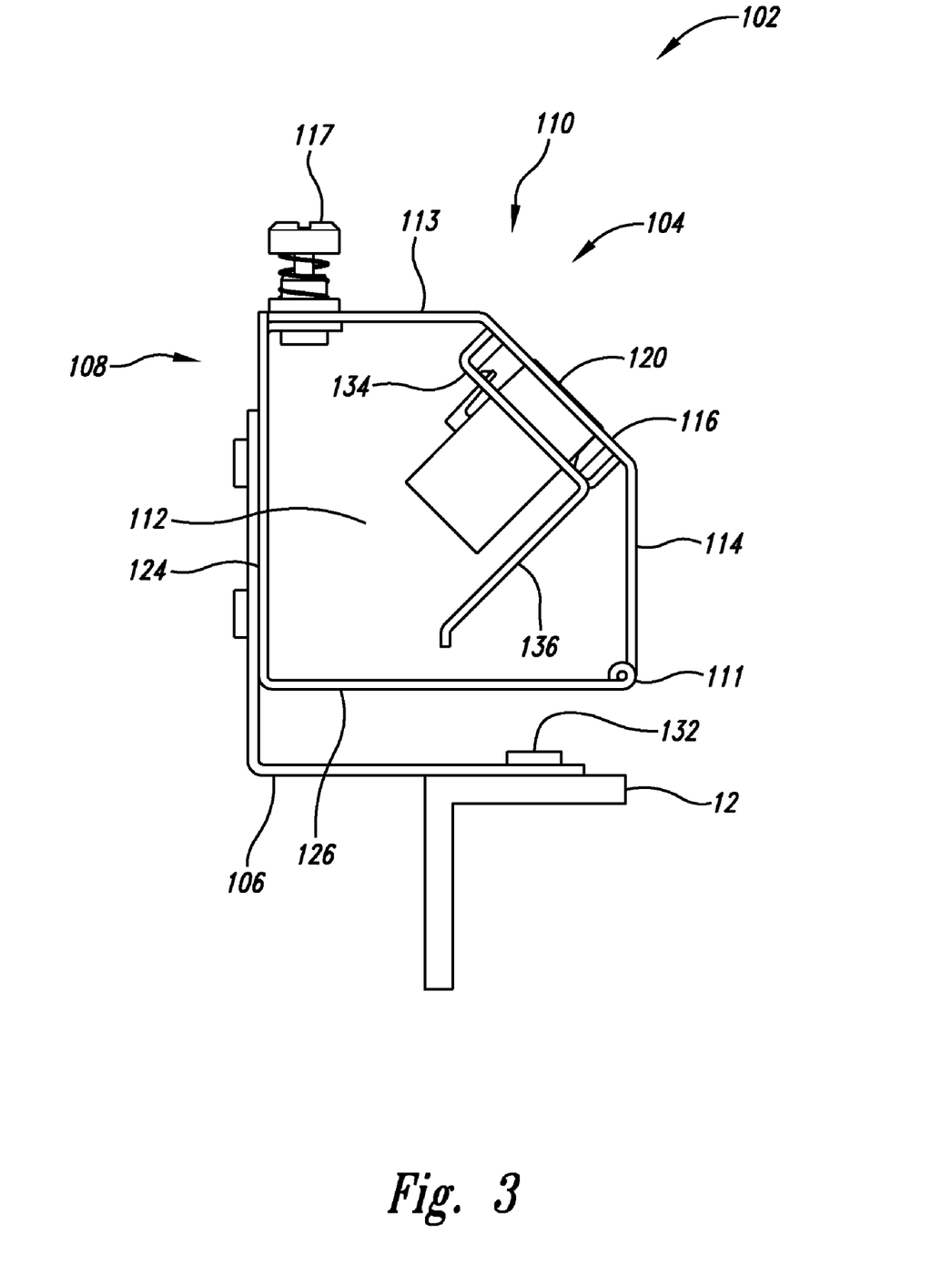
FIG. 3 is a top plan view of one of the rack extension panels shown in FIG. 1 with a door section in a closed position.

As shown in FIG. 3, the connector housing 104 further includes a connector retainer bracket 134 affixed to the angled portion 116 and extending into the interior area 112 of the connector housing to secure the connectors 120 to the angled portion 116 of the door section 110. A cable guide 136, such as a plate or other such member, extends orthogonally from the angled portion 116 into the interior area 112 of the connector housing 104 to help position portions of service cables (not shown) that are coupled to the connectors 120. The cable guide 136 can be also useful in positioning service cables when the door section 110 is swung open as shown in FIG. 4.

Figure 5:
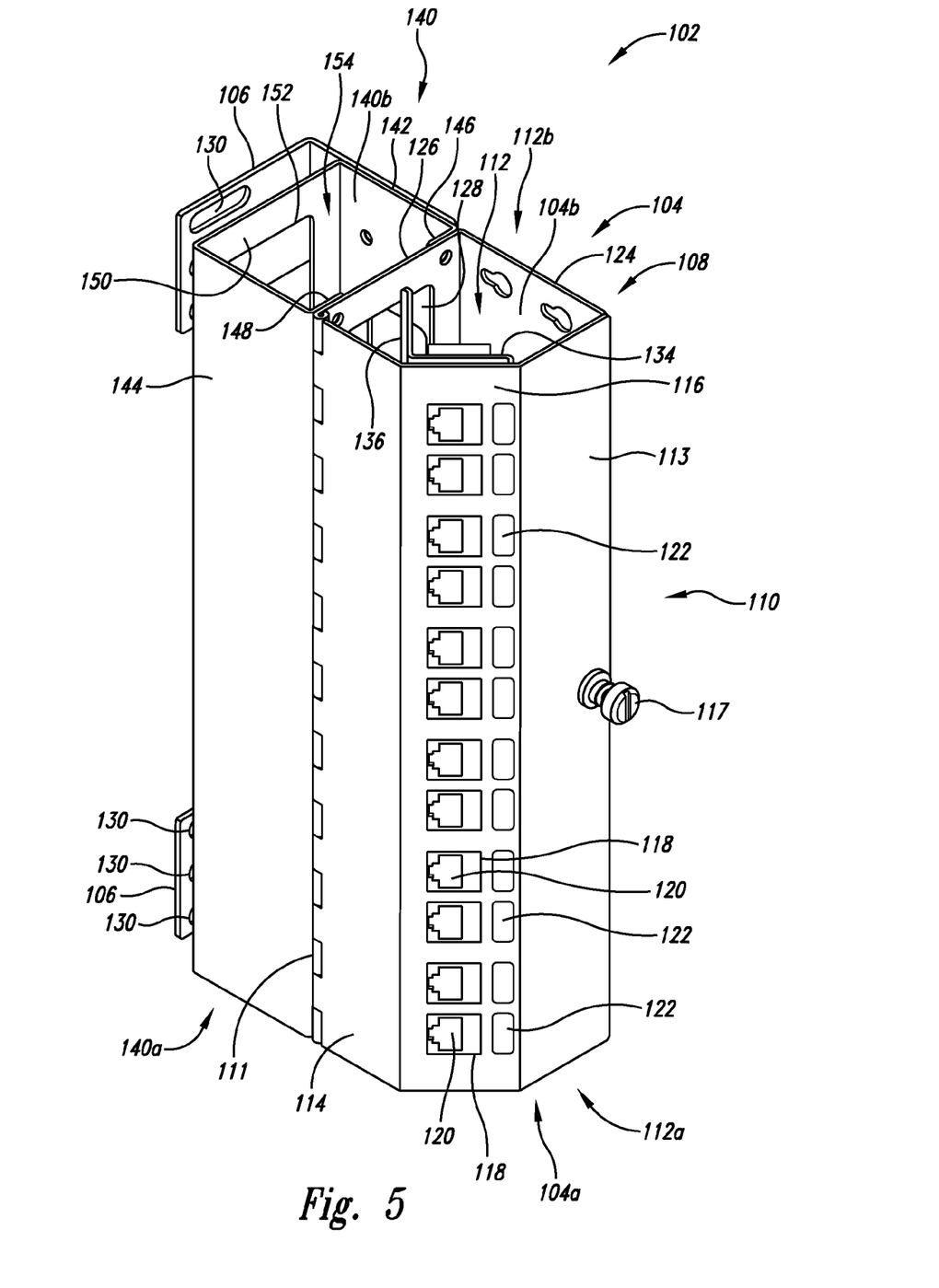
FIG. 5 is a perspective front view of a second implementation of the rack extension panel including a cable raceway.
Figure 6:
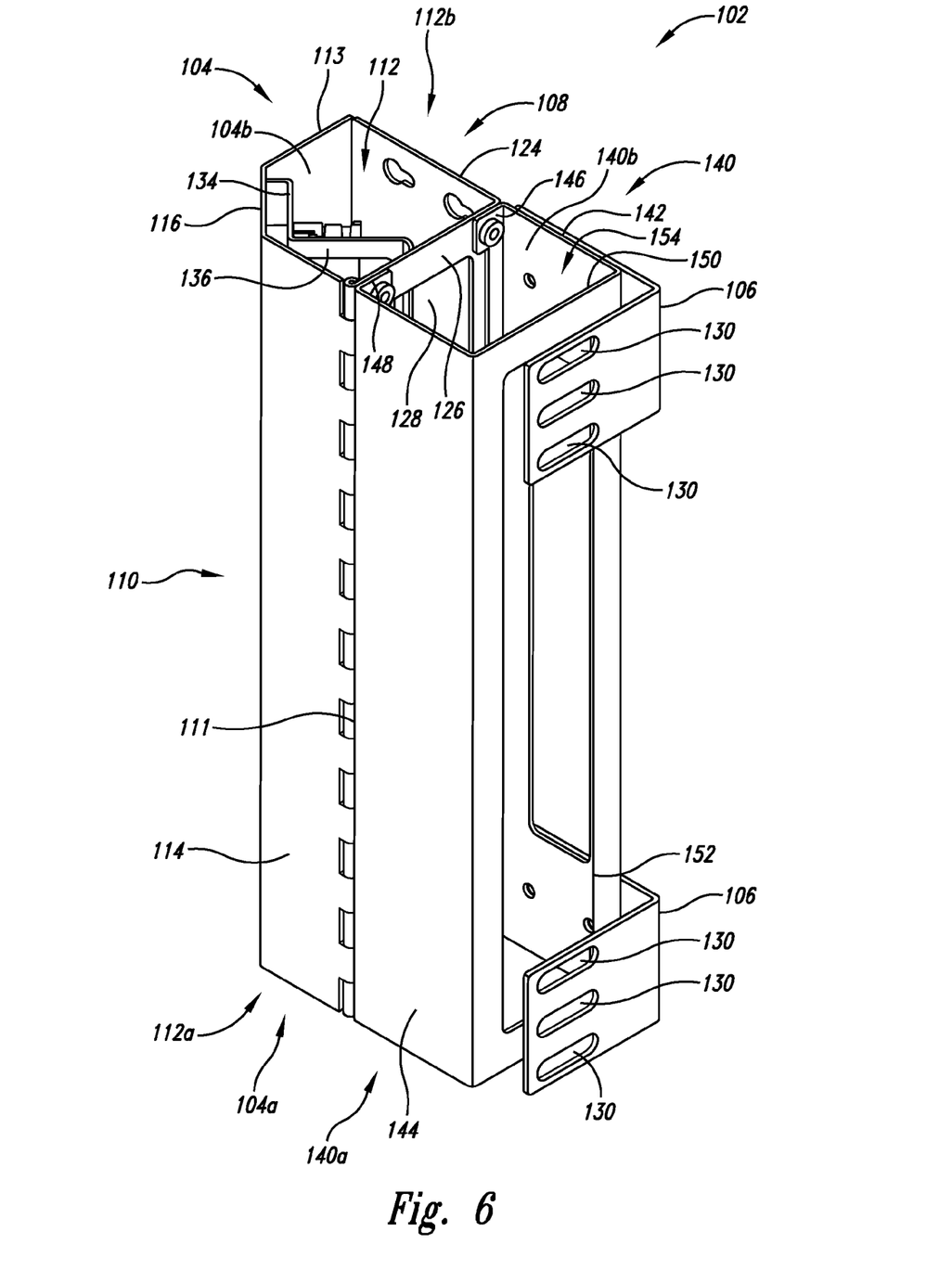
FIG. 6 is a perspective rear view of the second implementation of the rack extension panel of FIG. 5.
Figure 7:
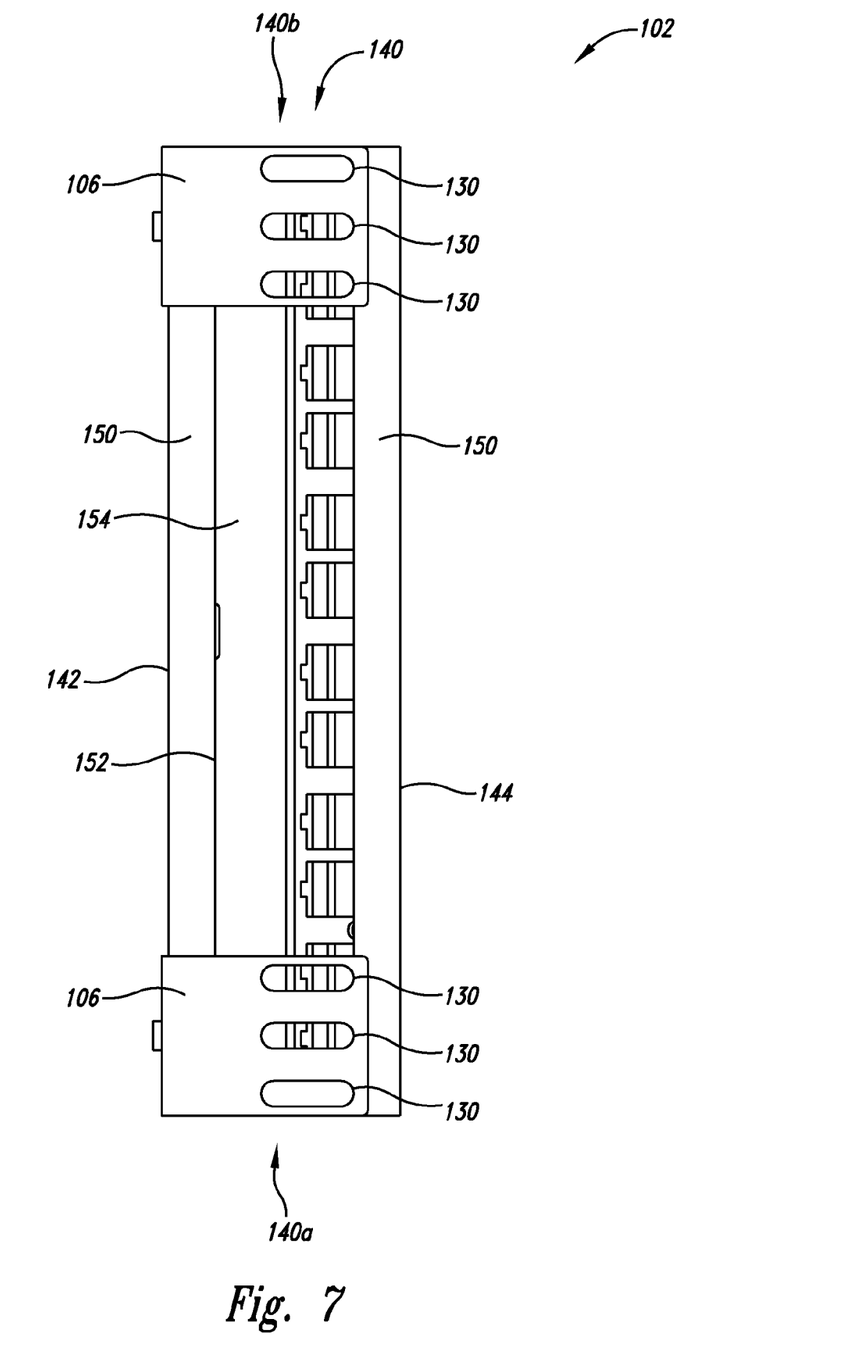
FIG. 7 is a rear elevational view of the second implementation of the rack extension panel of FIG. 5.

A second implementation of the rack extension panel 102 is shown in FIGS. 5-7 to include a raceway 140 positioned between the connector housing 104 and the bracket 106. The raceway 140 includes an outer side 142 having an opening 143, an inner side 144, an outer front-side portion 146 extending orthogonally inward from the outer side 142 and an inner front-side portion 148 extending orthogonally inward from the inner side 144. The outer front-side portion 146 and the inner front-side portion 148 serve to couple the raceway 140 with the connector housing 104. The raceway 140 further includes a rear side 150 having an opening 152 for service cable access. The raceway 140 provides guidance and support for various configurations of service cable in addition to that provided by the connector housing 104. The raceway 140 encloses an interior area 154, which has a first end opening 140a and a second end opening 140b to allow for stacking of multiple copies of the rack extension panel 102 with raceway 140 end-to-end, one on top of the other.

Figure 8:
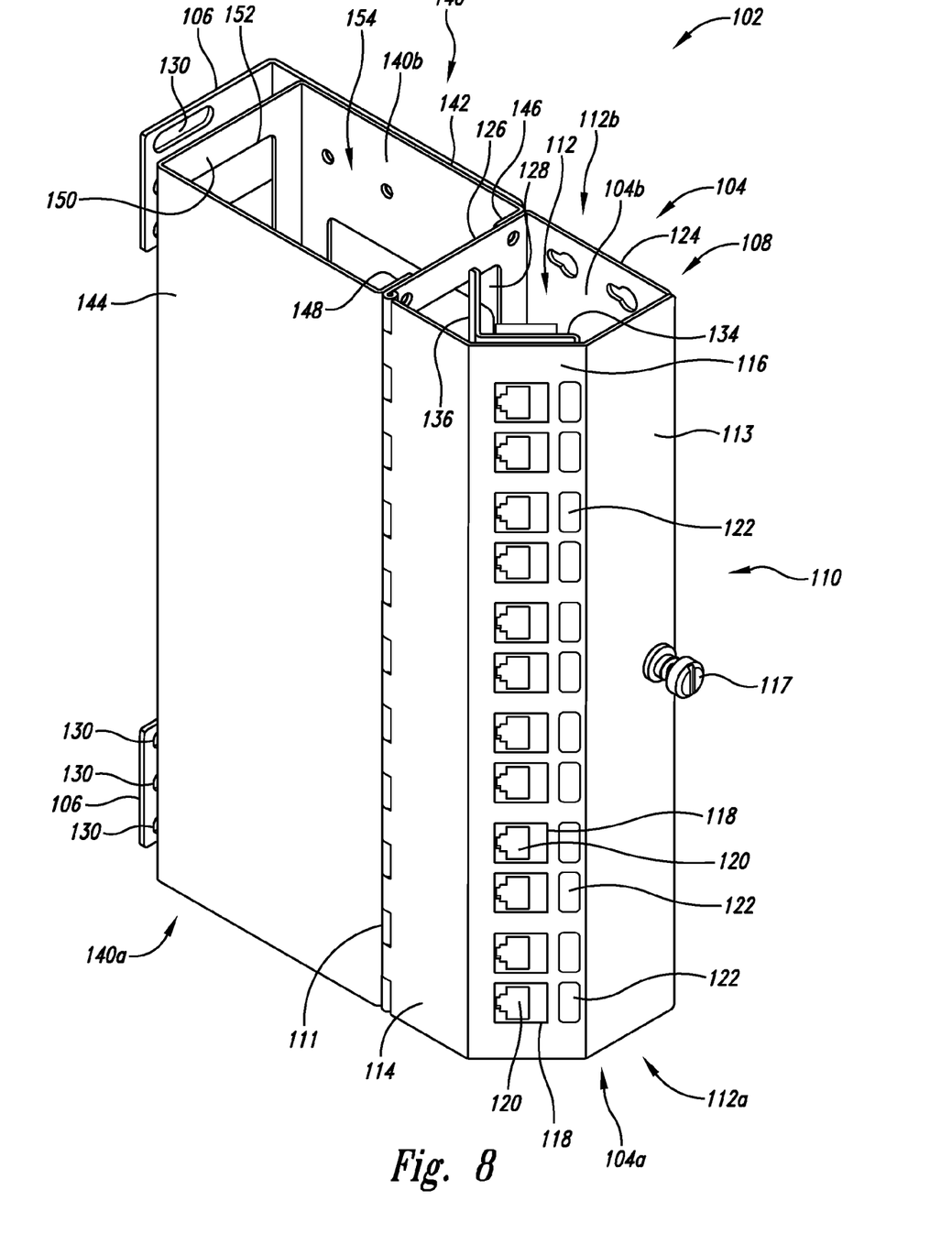
FIG. 8 is a perspective front view of a third implementation of the rack extension panel.

A third implementation of the rack extension panel 102 is shown in FIG. 8 to include a larger dimensional implementation of the raceway 140 having extended versions of the outer side 142 and the inner side 144.

Figure 9:
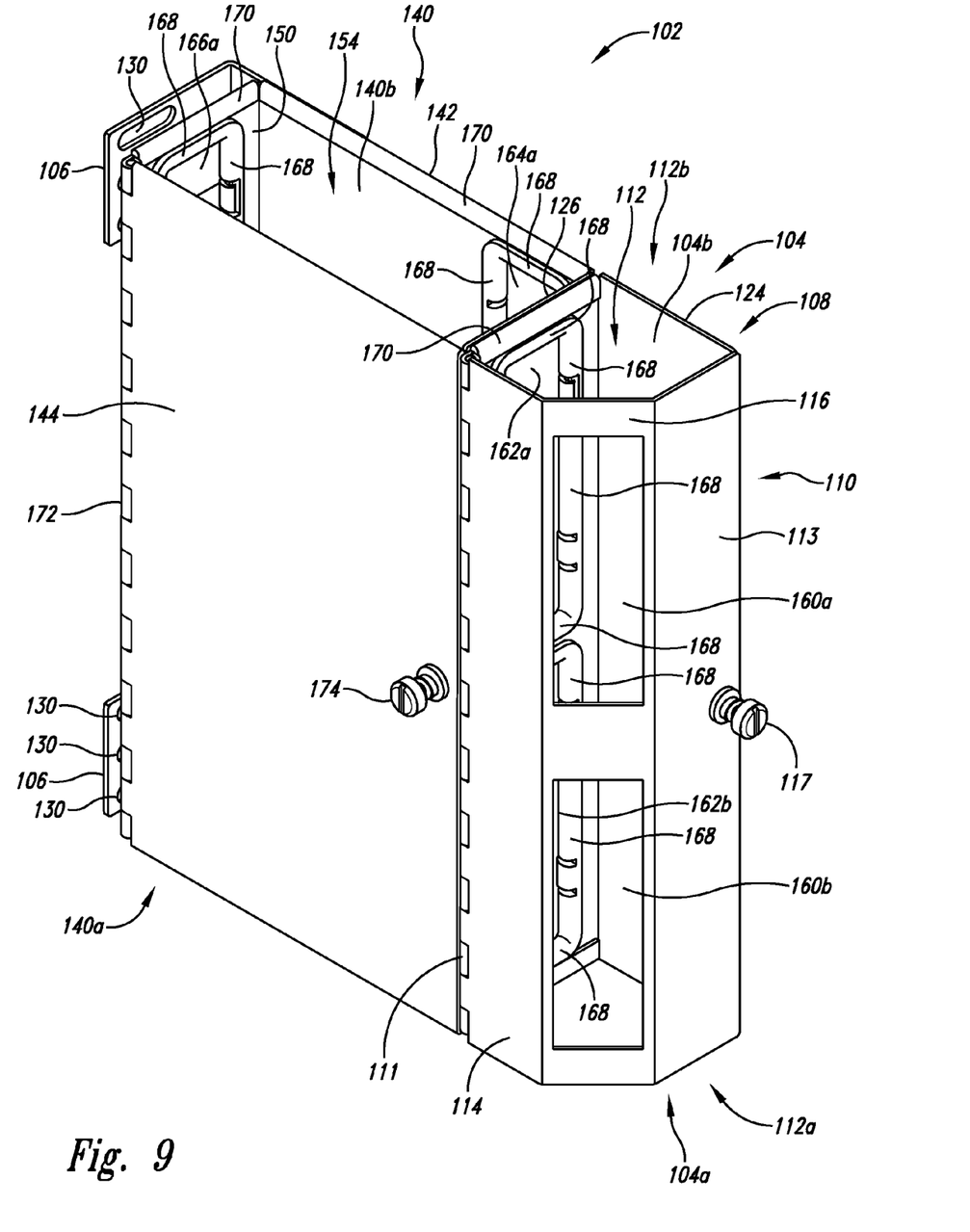
FIG. 9 is a perspective front view of a third implementation of the rack extension panel including a cable raceway.
Figure 10:
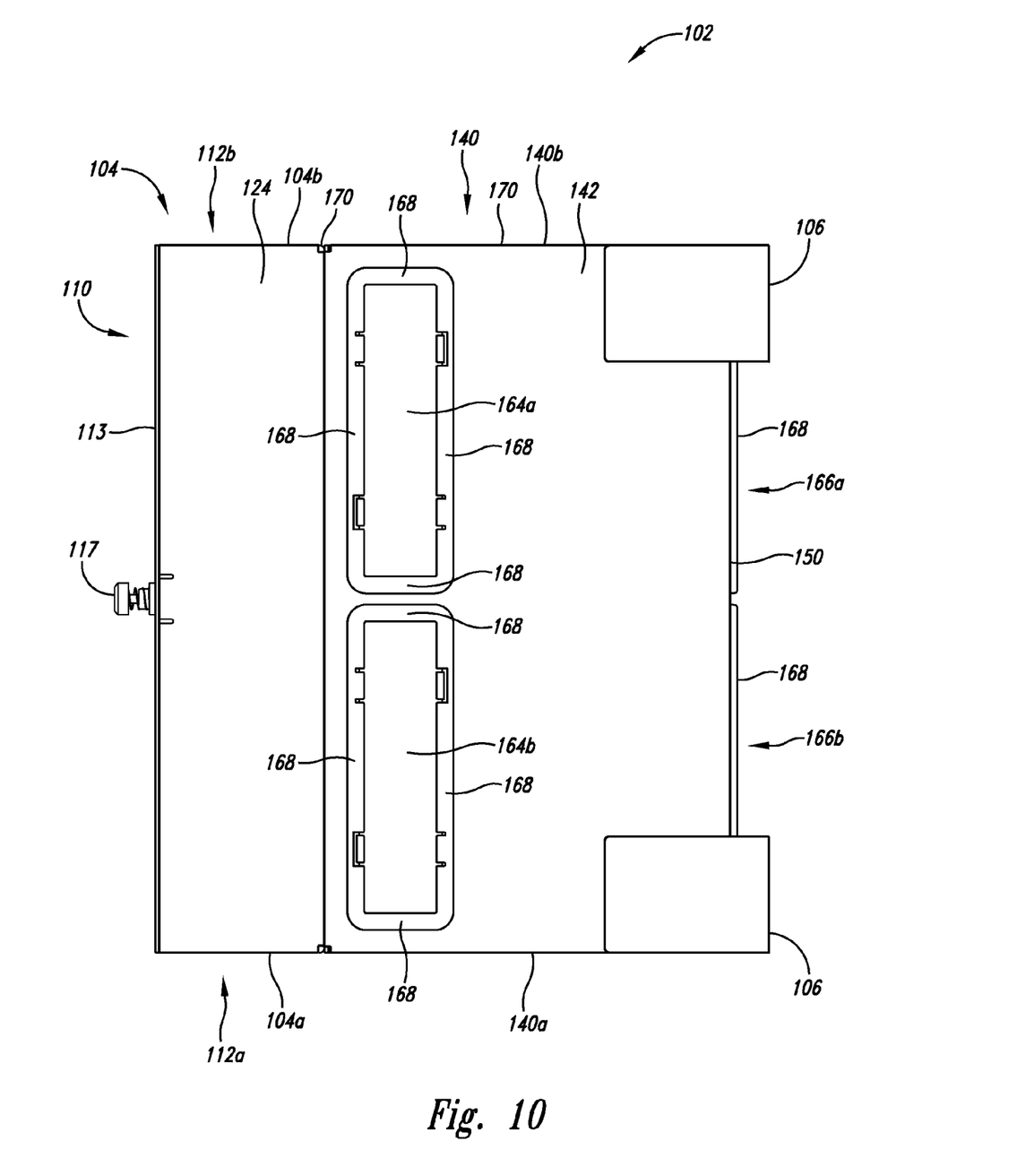
FIG. 10 is a right side elevational view of the third implementation of the rack extension panel of FIG. 9.

A fourth implementation of the rack extension panel 102 is shown in FIG. 9 to include an upper opening 160a and a lower opening 160b in the front portion 116 of the door section 110 to accept panels having the holes 118 to receive the connectors 120 or with the connectors 118 pre-molded into the panels. The rear portion 126 of the stationary section 108 has an upper opening 162a and a lower opening 162b that allows access for service cables (not shown) into the interior area 112 of the connector housing 104. The outer side 142 of the raceway 140 includes an upper opening 164a and a lower opening 164b (shown in FIG. 10).

Figure 11:
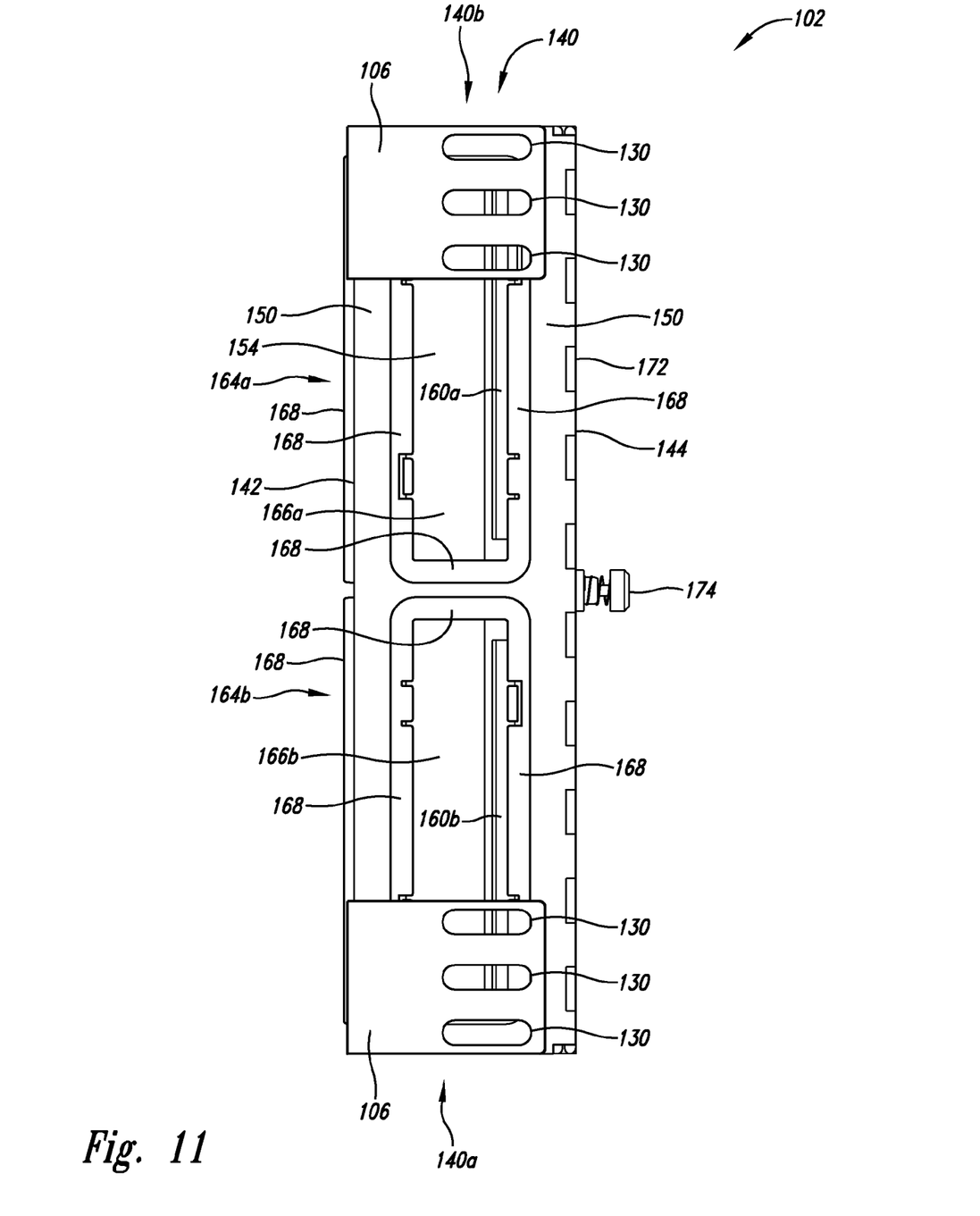
FIG. 11 is a rear elevational view of the third implementation of the rack extension panel of FIG. 9.
Figure 12:
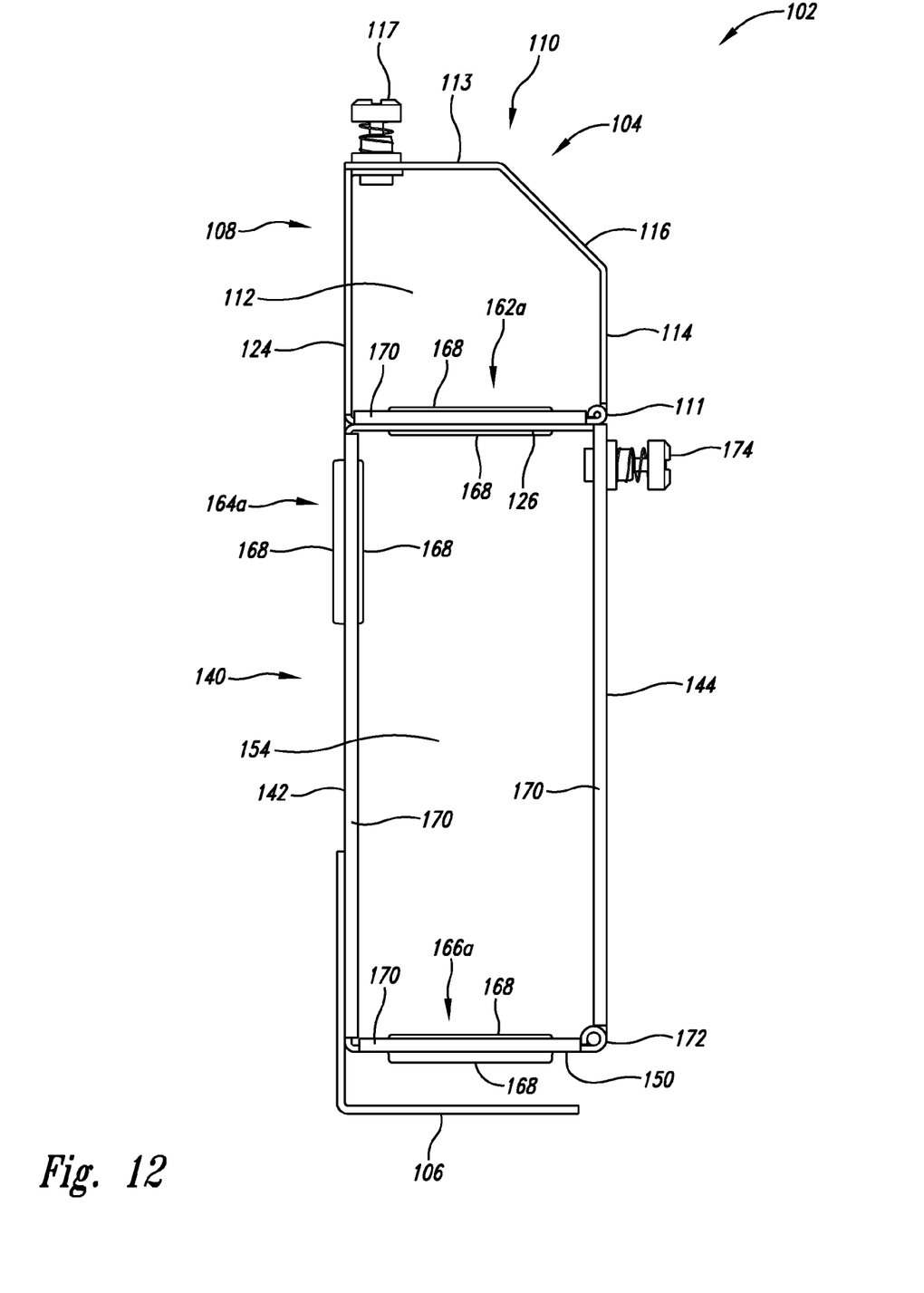
FIG. 12 is a top plan view of the third implementation of the rack extension panel of FIG. 9.

The rear side 150 of the raceway 140 has an upper opening 166a and a lower opening 166b for service cable access as shown in FIG. 11. The upper opening 160a, the lower opening 160b, the upper opening 162a, the lower opening 162b, the upper opening 164a, the lower opening 164b, the upper opening 166a, and the lower opening 166b are framed with curved edges 168 to reduce wear on cables coming into contact with them. As shown in FIGS. 9-12, the rear portion 126, the outer side 142, the inner side 144, outer front side portion 146, inner front side portion 148, and the rear side 150 curved edges 170 to reduce wear on cables coming into contact with them. The inner side 144 is coupled to the rear side 150 with a hinge 172 and can be swung open by unlatching a release handle 174 secured thereto.

Aspects of the disclosed equipment rack panel system include a first member supporting connectors and a second member affixed to an equipment rack. The first member and second member extend from the equipment rack without occupying space in the equipment that could otherwise be used for equipment such as having a rack unit format of single, multiple, or fractional rack unit dimensions encompassing a fractional width of the equipment rack and/or a fractional height of the equipment rack. In some aspects, the second member is affixed to a post of the equipment rack. Other aspects include the first member being hingedly coupled to the second member. Certain aspects include the second member being affixed to the equipment rack through attachment means, such as bolting, whereas in other aspects the second member and the equipment rack are an integral unit. Additional aspects include the first member being formed to partially enclose service cables coupled to an interior side of the connectors. Other aspects include the connectors receiving equipment cables, the equipment cables being coupled to equipment located in rack unit format areas of the equipment rack and extending through an exterior area of the first member to the first member.

Further aspects include the first member having an angled side extending between perpendicularly oriented side portion and a front portion of the first member. Other aspects include the second member having a cable channel to guide and support service cables coupled to the interior side of the connectors. Additional aspects include a portion of the first member being disengagedly coupled to a portion of the second member through a releasable fastening means.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. For an equipment rack having an interior to receive equipment for support thereof by the equipment rack, a panel assembly comprising:
a housing having a plurality of elongated sides extending between a first end and a second end of the housing, the plurality of elongated sides arranged to define an area with a first opening at the first end of the housing and a second opening at the second end of the housing, the first opening and the second opening inwardly communicating with the area, a first side of the plurality of elongated sides having apertures shaped and sized to receive connectors for mounting to the housing;
a raceway extending along and coupled to a second side of the plurality of elongated sides of the housing, the raceway having an interior, the second side having an opening inwardly communicating with the interior of the raceway; and
an attachment portion shaped and coupled with the raceway to be used to couple both the raceway and the housing with the equipment rack with the raceway positioned between the housing and the equipment rack and at least a portion of the housing positioned outside the interior of the equipment rack.

2. The panel assembly of claim 1 for use with cables, wherein the attachment portion is coupled with a first side of the raceway, the first side of the raceway comprising at least one opening through which cables may extend in the interior of the raceway.

3. The panel assembly of claim 1 wherein the attachment portion is a bracket.

4. A panel assembly positionable in a first position adjacent an equipment rack extending along an upright dimension of the equipment rack, the panel assembly comprising:
a first housing having a plurality of elongated sides and a plurality of connectors coupled to a first one of the elongated sides, the elongated sides arranged to define an interior area, the first housing having first and second openings located at opposite ends of the first housing, the first opening and the second opening of the first housing inwardly communicating with the first housing area;
at least a second housing having a plurality of elongated sides and a plurality of connectors coupled to a first one of the elongated sides, the elongated sides arranged to define an interior area, at least the second housing having first and second openings located at opposite ends of the second housing, the first opening and the second opening of the second housing inwardly communicating with the second housing area, in the first position, the first housing being oriented for the first opening of the first housing to be aligned with and to inwardly communicate with the second opening of the second housing with the first opening of the first housing facing the second opening of the second housing; and
a raceway extending along and coupled to the first housing and at least the second housing with a first portion of the raceway being positioned between the equipment rack and the first housing, and a second portion of the raceway being positioned between the equipment rack and the at least the second housing when the panel assembly is in the first position.

5. A panel assembly positionable in a first position adjacent an equipment rack extending along a vertical dimension of the equipment rack, the panel assembly comprising:
a first housing and a at least second housing, each having a plurality of elongated sides arranged to define an area therein, each of the first housing and the second housing having first and second openings located at opposite ends thereof, the first opening and the second opening inwardly communicating with the area, in the first position, the first housing being oriented for the first opening aligned with and inwardly communicating with the second opening of at least the second housing when the second housing is positioned above the first housing;
a plurality of connectors coupled to a first side of the plurality of sides of each of the first housing and at least the second housing; and
a raceway extending along and coupled to the first housing and at least the second housing with a first portion of the raceway being positioned between the equipment rack and the first housing, and a second portion of the raceway being positioned between the equipment rack and the at least the second housing when the panel assembly is in the first position.

6. For an equipment rack having an interior to receive equipment for support thereof by the equipment rack, a panel assembly comprising:
a housing having a plurality of elongated sides arranged to define an interior area, a rotatable first side of the plurality of sides having holes shaped and sized to receive connectors for coupling with the housing;
a hinge;
a second side of the plurality of elongated sides being coupled to the first side through the hinge;
a raceway coupled with the second side, the second side having an opening inwardly communicating with the raceway; and
an attachment portion shaped and coupled with the raceway to couple both the raceway and the housing to the equipment rack at a location outside of the interior of the equipment rack with the raceway positioned between the housing and the equipment rack.

7. For an equipment rack having an interior to receive equipment for support thereof by the equipment rack, a panel assembly comprising:
a housing having a plurality of elongated sides arranged to define an area, the plurality of elongated sides including a first side, a second side, and a third side, the first side and the second side of the plurality of elongated sides orthogonally oriented with one another and coupled to one another through the third side, the third side extending between the first side and the second side at a non-orthogonal angle relative to the first side and the second side, the third side having holes shaped and sized to receive connectors;
a raceway coupled with the housing, the housing having an opening inwardly communicating with the raceway; and
an attachment portion shaped and coupled with the raceway to couple the housing to the equipment rack at a location outside of the interior of the equipment rack with the raceway positioned between the housing and the equipment rack.

8. The panel assembly of claim 7 further including a hinge and a release handle, the third side being rotatably coupled to the first side by the hinge, the third side releasably coupled to the second side by the release handle.

9. A system for coupling to an equipment rack, the equipment rack having first and second elongated upright posts configured to support equipment, the first and second elongated posts being laterally spaced apart and defining a space therebetween within which equipment supported by the first and second elongated posts is positionable, the system comprising:
an elongated housing configured to be in an upright position extending along the first elongated post outward of the space defined between the first and second elongated posts and defining an upright elongated interior housing space within the housing, the housing having an elongated first wall adapted to support a plurality of connectors longitudinally extending along the first wall and accessible from within the interior housing space by conductors extendable through the interior housing space and connectable to the plurality of connectors, the first wall being selectively rotatable between an open position providing access to the interior housing space and a closed position, the housing further including an attachment portion;
an elongated raceway coupled with the attachment portion of the housing, the raceway defining an upright elongated interior raceway space within the raceway, the housing and the raceway having a passageway therebetween for lateral passage of conductors therethrough to be connected to the plurality of connectors; and
means for coupling the raceway to the first elongated post to thereby couple the housing to the first elongated post with the raceway positioned between the housing and the first elongated post, the raceway being in an upright position extending along the first elongated post outward of the space defined between the first and second elongated posts thereby positioning the housing outward of the space defined between the first and second elongated posts.

10. The system of claim 9 wherein the housing further includes an upper opening and a lower opening, each communicating with the interior housing space and providing access to the interior space for conductors to be connected to the plurality of connectors.

11. The system of claim 9 wherein the housing further has a stationary second wall having an aperture therein sized for the passage of conductors to be connected to the plurality of connectors therethrough.

12. The system of claim 11 wherein the housing further includes an upper opening and a lower opening, each communicating with the interior housing space and providing access to the interior space for conductors to be connected to the plurality of connectors.

13. The system of claim 9 wherein the raceway further includes an upper opening and a lower opening, each communicating with the interior raceway space.

14. A system for coupling to an equipment rack, the equipment rack having first and second elongated upright posts configured to support equipment, the first and second elongated posts being laterally spaced apart to define a rectangularly shaped space therebetween in which equipment is positionable, the system comprising:
   an elongated housing configured to be in an upright position extending along the first elongated post outward of the rectangularly shaped space and defining an upright elongated interior space within the housing, the housing having an elongated first wall adapted to support a plurality of connectors longitudinally extending along the first wall and accessible from within the interior space by conductors extendable through the interior space and connectable to the plurality of connectors;
   an elongated raceway coupled with the housing, the raceway defining an upright elongated interior raceway space within the raceway, the housing and the raceway having a passageway therebetween for lateral passage of conductors therethrough to be connected to the plurality of connectors; and
   a bracket configured to couple the raceway to the first elongated post with the raceway positioned between the housing and the first elongated post and extending along the first elongated post outward of the rectangularly shaped space defined between the first and second elongated posts thereby positioning the housing outward of the rectangularly shaped space.

15. The system of claim 14 wherein the housing further includes an upper opening and a lower opening, each communicating with the interior housing space and providing access to the interior space for conductors to be connected to the plurality of connectors.

16. The system of claim 14 wherein the housing further has a stationary second wall having an aperture therein sized for the passage of conductors to be connected to the plurality of connectors therethrough.

17. The system of claim 16 wherein the housing further includes an upper opening and a lower opening, each communicating with the interior housing space and providing access to the interior space for conductors to be connected to the plurality of connectors.

18. The system of claim 14 wherein the raceway further includes an upper opening and a lower opening, each communicating with the interior raceway space.

19. The system of claim 14 for use with the first and second elongated posts defining a lateral plane, wherein the first wall is facing laterally inward at an acute angle with respect to the lateral plane.

20. The system of claim 19 wherein the housing has a stationary second wall with the first wall being rotatably coupled to the second wall.

21. The system of claim 20 wherein the second wall is arranged to be in face-to-face juxtaposition with the lateral plane, the first wall being rotatable from a closed position laterally inward to an open position providing lateral access to the interior housing space.

22. The system of claim 20 wherein the housing has a stationary third wall arranged to be transverse to the lateral plane.

* * * * *